Figure 1:
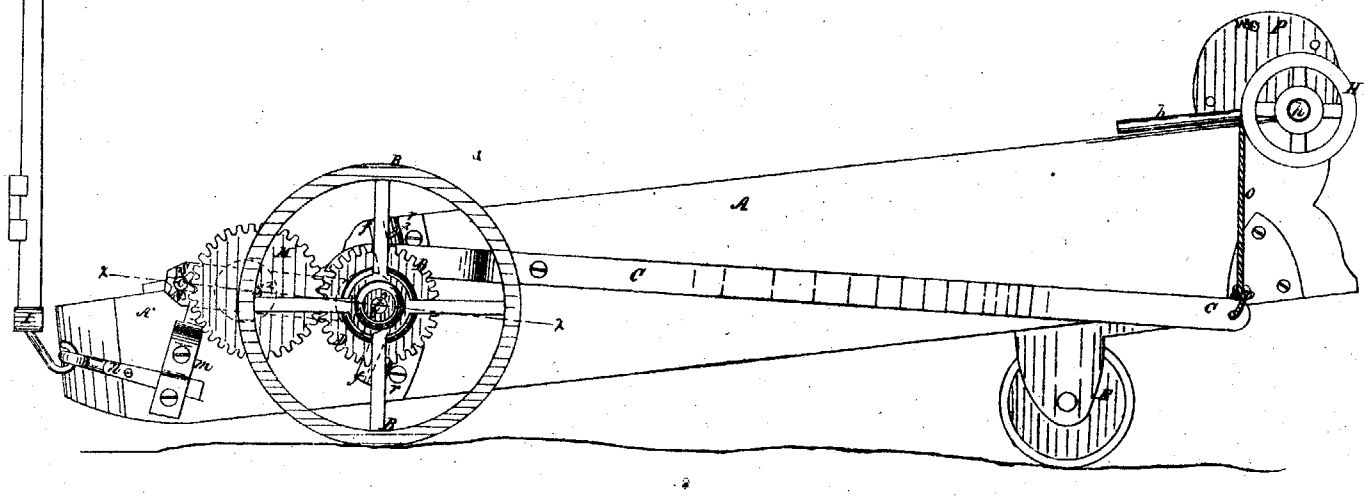

Sheet 1.
2 Sheets

W. N. Whitely Jr.

Mower

No 985

Reissued Jun. 19, 1860.

Witnesses.

Sol J. Houck

Emanuel Riegel

Wm. Whitely Jr.

Sheet 2.
2 Sheets.
W. N. Whitely, Jr.
Mower.
№ 985 Reissued Jun. 19, 1860.
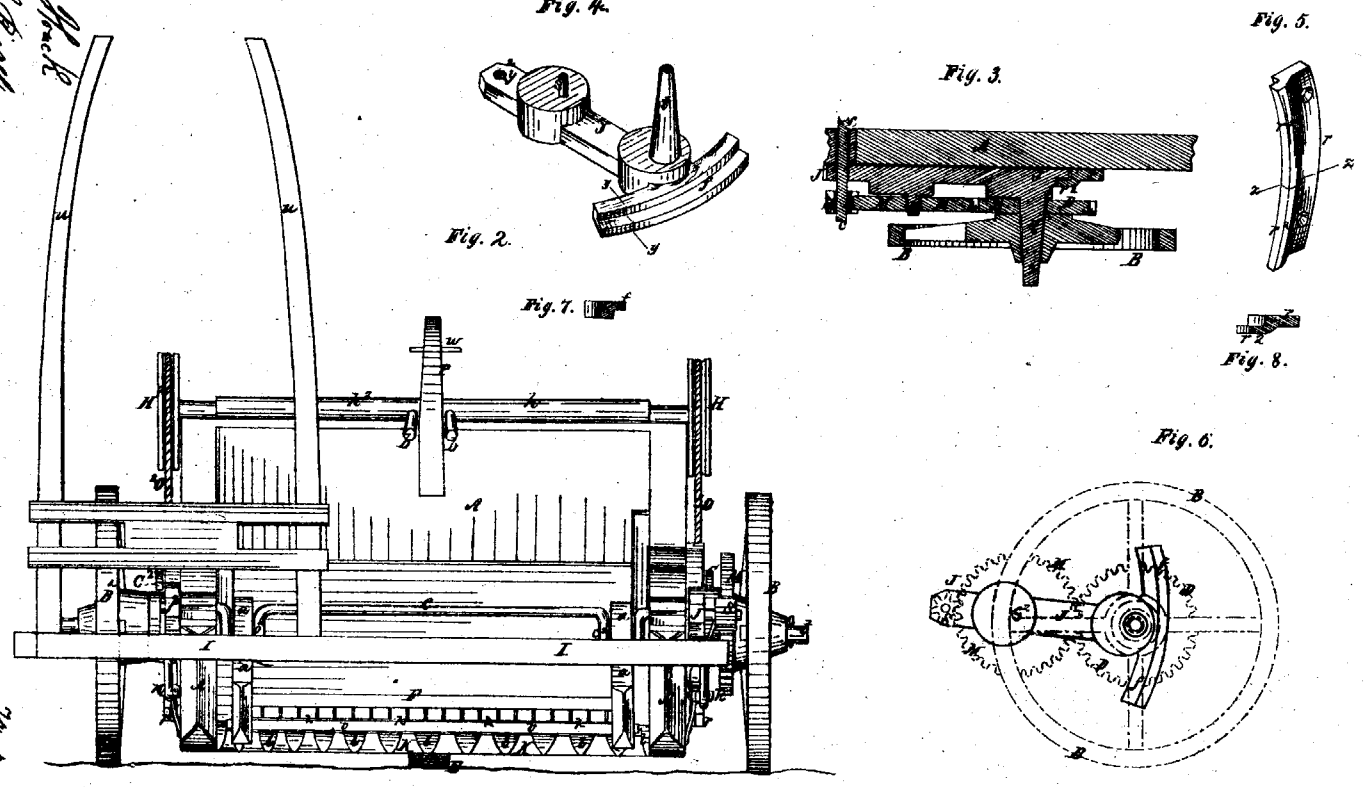
Witnesses.
Sol J. Houck
Emanuel Riegel
W. N. Whitely Jr.

UNITED STATES PATENT OFFICE.

W. N. WHITELEY, JR., OF SPRINGFIELD, OHIO, ASSIGNEE OF T. S. STEADMAN.

IMPROVEMENT IN CLOVER AND GRASS SEED HARVESTERS.

Specification forming part of Letters Patent No. 10,967, dated May 23, 1854; Reissue No. 985, dated June 19, 1860.

DIVISION A.

*To all whom it may concern:*

Be it known that THOMAS S. STEADMAN, of Murray, in the county of Orleans and State of New York, invented certain new and useful Improvements in Clover and Grass Seed Harvesters, of which the following is a full, clear, and exact description, reference being had to the annexed drawings, which make part of this specification.

This invention relates to that kind of machine in which the height of the cutting apparatus (from the ground) is varied by changing the relative positions of the main frame and master-wheel axle or shaft; and it consists in connecting the main frame or box of the machine with the master-wheel axle by means of an arm or supplementary frame on which the master-wheel's axle is formed or fastened, and which arm is arranged with the main frame or box and its pinion-shaft in such a manner that said main frame may be raised and lowered and held at different heights relatively to the master-wheel axle, and so that the said main frame and supplementary frame shall both vibrate relatively to each other around a common center which is coincident with the axis of the pinion-shaft.

To enable those skilled in the art to make and use the invention, I will proceed to describe its construction and operation by referring by letters to the accompanying drawings, which form part of this specification, and which illustrate a machine embracing my improvement or invention.

Figure 1 represents a side elevation of the machine. Fig. 2 represents a front elevation. Fig. 3 represents a cross-section at the line *x x* of Fig. 1. Fig. 4 represents a perspective view of the arm or supplementary frame. Fig. 5 represents a perspective view of the guide-plate of the supplementary frame. Fig. 6 represents in detail view the supplementary frame and gears. Fig. 7 shows a cross-section at *y y* of Fig. 4, and Fig. 8 is a cross-section at the line *z z* of Fig. 5.

Similar letters represent the same part in the different views.

A represents the main frame or box of the machine, which is furnished near the center of its rear end with a supporting caster-wheel, E, and near its forward end the wheels B and $B^2$ are placed, as shown in the drawings, all of which serves to support the main frame or box A when the forward end of the machine is not running on the ground, and one of which, B, is the master or main driving wheel. *b* is its axle or shaft. *c* is the pinion-shaft. J is the arm or supplementary frame on which the master-wheel and gears are hung, and which is arranged on the end of the pinion-shaft *c*.

The wheel $B^2$ is hung on a plate, $J^2$, similar to arm J, and which also moves around the end of the shaft *c*. The arms J and $J^2$ are guided at their movable ends by guide-plates *r*, fastened to the sides of the box A, and are retained in any desired relative position of the box A by means of levers C $C^2$.

K is the finger-bar, and *i* are the fingers, and *x* are the cutters, the bar *r* of which is operated by the cranks $c^2$ of the pinion-shaft through the medium of the bars *a*.

The levers C and $C^2$ not only hold the frame A at any desired elevation relatively to the axle of the side wheels, but also shift the frame in relation to said wheels' axles.

F is the rake, and *u* the shafts by which the team is engaged with the apparatus. The levers C and $C^2$ are operated by cords *o* $o^2$, which pass over pulleys H H on the outer ends of the shafts *h* $h^2$, which shafts are furnished with hand-levers *b*, which are checked or chocked by pins *w* in the holes of the plate or disk P.

Since many of those parts above alluded to which are in any wise different from the ordinary practice constitute the subjects of other applications filed simultaneously with this, in which they will be particularly and fully explained, I shall here only describe fully that feature of the machine which constitutes the subject of this application.

It will be seen by reference to the drawings that the arm J is formed with a hole, *y*, at one end to accommodate the shaft *c*, and with a curved guide-flange, *f*, at the other end, to work in the groove formed between the projecting lip $r^2$ of the guide-plate *r* and the side of the box A, to which the guide-plate is fastened, and said arm J is furnished with a projecting stud, *t*, which constitutes the axle of the master-wheel B, and with a stud, $s^2$, for the intermediate gear, M, which meshes on one side into the main driving-gear D and on the opposite side into the pinion S on the end of the shaft *c*, which drives the cutting apparatus.

It will be understood that the axes of the gear, except that of pinion S, are arranged on a single piece, J, and that the latter turning only on the pinion-shaft *c*, may be said to virtually hold in itself all the gearing, and it will be readily comprehended that when the centers of the gears exist in one plate or bar thus the gears will always remain in perfect adjustment with each other; and it will be seen that while this important desideratum is attained by this improved method of construction, the shifting of the main frame relatively to the master-wheel axle may be more readily accomplished than heretofore, and the machine is also rendered more simple than when the bearing and axle or axle alone of the master-wheel had to be shifted.

The method of changing the relative positions of the main frame and master-wheel axle and retaining them in any desired position by means of the levers C $C^2$, cords *o* $o^2$, and shafts *h* $h^2$, and hand-levers constitutes the subject of another application, in which said method will be found fully explained, and need not be reiterated in this application.

It will be understood that this invention may be subjected to various modifications of the embodiment illustrated without departing from its spirit.

The gear M may be taken off of its shaft or stud when desired, when the machine can run along without driving the cutting apparatus.

What is claimed as the invention of the said THOMAS S. STEADMAN, and is desired to be secured by Letters Patent, is—

1. The main frame or box A, which carries the pinion which drives the cutters, in combination with the arm or supplementary frame J, provided with axle *t*, and the main wheel and gearing, substantially as described, for the purposes specified.

2. The arm or supplementary frame, in combination with the master-wheel and gearing, when said arm or supplementary frame is so connected with the main frame as to vibrate from and around the pinion-shaft, substantially as shown and described, for the purpose set forth.

In testimony whereof I have hereunto set my hand and affixed my seal this 27th day of March, A. D. 1860.

W. N. WHITELEY, JR. [L. S.]

Witnesses:
SOL. J. HOUCK,
EMANUEL BIEGEL.